United States Patent
Lin

(10) Patent No.: US 9,288,460 B2
(45) Date of Patent: Mar. 15, 2016

(54) METHOD, APPARATUS, AND SYSTEM FOR ADJUSTING WHITE BALANCE DATA

(71) Applicants: BOE TECHNOLOGY GROUP CO., LTD., Beijing (CN); BEIJING BOE DISPLAY TECHNOLOGY CO., LTD., Beijing (CN)

(72) Inventor: Yang Lin, Beijing (CN)

(73) Assignees: BOE TECHNOLOGY GROUP CO., LTD.; BEIJING BOE DISPLAY TECHNOLOGY CO., LTD.

( * ) Notice: Subject to any disclaimer, the term of this patent is extended or adjusted under 35 U.S.C. 154(b) by 63 days.

(21) Appl. No.: 14/361,342

(22) PCT Filed: Dec. 13, 2013

(86) PCT No.: PCT/CN2013/089399
§ 371 (c)(1),
(2) Date: May 29, 2014

(87) PCT Pub. No.: WO2015/018158
PCT Pub. Date: Feb. 12, 2015

(65) Prior Publication Data
US 2015/0222866 A1    Aug. 6, 2015

(51) Int. Cl.
*H04N 9/73* (2006.01)
*G06T 7/40* (2006.01)
*G06T 11/00* (2006.01)

(52) U.S. Cl.
CPC *H04N 9/73* (2013.01); *G06T 7/408* (2013.01); *G06T 11/001* (2013.01); *H04N 9/735* (2013.01)

(58) Field of Classification Search
CPC ........ H04N 9/735; H04N 9/73; G06T 11/001; G06T 7/408
See application file for complete search history.

(56) References Cited

U.S. PATENT DOCUMENTS

| 4,097,892 | A * | 6/1978 | Balding | G03B 27/73 358/527 |
|---|---|---|---|---|
| 4,274,107 | A * | 6/1981 | Tamura | H03G 3/20 327/306 |
| 6,097,445 | A * | 8/2000 | Goto | H04N 9/73 348/379 |
| 2010/0110297 | A1* | 5/2010 | Kameoka | H04N 5/44513 348/569 |
| 2010/0188203 | A1* | 7/2010 | Wallace | B60Q 11/00 340/454 |
| 2013/0155330 | A1* | 6/2013 | Longhurst | H04N 9/64 348/708 |
| 2014/0028699 | A1* | 1/2014 | Kurtz | G01J 3/465 345/590 |

FOREIGN PATENT DOCUMENTS

| CN | 1941922 | 4/2007 |
|---|---|---|
| CN | 201278571 | 7/2009 |
| CN | 101692713 | 4/2010 |
| CN | 101742168 | 6/2010 |
| CN | 102790887 | 11/2012 |
| CN | 103414905 | 11/2013 |
| JP | 2006157222 | 6/2006 |

OTHER PUBLICATIONS

Office Action issued in corresponding Chinese Application No. 2013103439548 dated Feb. 16, 2015.
International Search Report and Written Opinion issued in International Application No. PCT/CN2013/089399 dated Aug. 8, 2013.
P.R. China, First Office Action, App. No. 2013103439548, Oct. 28, 2014.
Written Opinion in PCT International Application No. PCT/CN2013/089399, dated Aug. 8, 2013.

* cited by examiner

*Primary Examiner* — Jefferey Harold
*Assistant Examiner* — Sean Haiem
(74) *Attorney, Agent, or Firm* — Baker Hostetler LLP

(57) ABSTRACT

A method provided by this disclosure for adjusting white balance data may comprise: reading a first white balance data of an image of a target signal source; performing a first adjustment operation such that the first white balance data complies with a predetermined target value and a second white balance data is generated; sending the second white balance data to signal source channels except the target signal source; and performing a second adjustment operation, wherein the second adjustment operation is a second adjustment performed on a third white balance data of the signal source channels according to the second white balance data.

18 Claims, 3 Drawing Sheets

METHOD, APPARATUS, AND SYSTEM FOR ADJUSTING WHITE BALANCE DATA

CROSS-REFERENCE TO RELATED APPLICATION

This application is the U.S. national phase of PCT Application No. PCT/CN2013/089399 filed on Dec. 13, 2013, which claims priority to Chinese Patent Application No. 201310343954.8 filed on Aug. 8, 2013, the disclosures of which are incorporated in their entirety by reference herein.

BACKGROUND OF THE INVENTION

1. Field of the Invention

This disclosure relates to the field of LED televisions, and in particular, to a method, apparatus, and system for adjusting white balance data.

2. Description of the Prior Art

As the LED technologies improve and mature, LED televisions are gradually battling for the market and are becoming mainstream products in the television market.

At present, some research and development experts have proposed methods and system for adjusting white balance data. However, most of the methods and systems are directed to adjustment on channels of all the signal sources of the LED television one channel by one channel. In this way, with respect to hardware couplings, such materials are cables are needed for all the signal sources; and with respect to software development, time for adjustment has been increased in multiple as that needed for adjustment with respect to a single channel. This increases the cost and the efficiency is lower than the method for single channel adjustment.

Accordingly, in the prior art, adjusting all the signal sources for the television one signal source by one signal source causes a waste of time.

SUMMARY OF THE INVENTION

This disclosure discloses a method, apparatus, and system for adjusting white balance data, to solve the problem that a great amount of time is consumed for sequentially adjusting all signal sources of a television in the prior art.

To achieve the above object, according to a first aspect of the present invention, a method for adjusting white balance data is provided, and the following technical solution is employed:

The method for adjusting white balance data may comprise: reading a first white balance data of an image of a target signal source; performing a first adjustment operation such that the first white balance data complies with a predetermined target value and a second white balance data is generated; sending the second white balance data to signal source channels except the target signal source; and performing a second adjustment operation, wherein the second adjustment operation is a second adjustment performed on a third white balance data of the signal source channels according to the second white balance data.

Further, the performing a first adjustment operation may comprise: comparing the predetermined target value with the first white balance data to acquire a comparison result; and when the comparison result indicates that the first white balance data does not comply with the predetermined target value, adjusting source data in the first white balance data such that the target data in the first white balance data falls within a range of the predetermined target value.

Further, the adjusting source data in the first white balance data may comprise: comparing color coordinates in the first white balance data with the predetermined target value; when the color coordinates are smaller than the predetermined target value, modifying a red gain or a green gain in the source data; re-reading the color coordinates, and determining whether the color coordinates fall within the range of the predetermined target value, if no, modifying a blue gain in the source data to ensure that the color coordinates are adjusted as within the range of the predetermined target value.

Further, the performing a second adjustment on a third white balance data of the signal source channels according to the second white balance data may comprise: checking automatically whether the second white balance data is duplicated to the signal source channels, and if there is a channel to which the second white balance data has not yet been duplicated, duplicating the second white balance data to the channel.

According to a second aspect of the present invention, an apparatus for adjusting white balance data is provided, and the following technical solution is employed:

The apparatus for adjusting white balance data may comprise: a reading module, configured to read a first white balance data of an image of a target signal source; a first performing module, configured to perform a first adjustment operation such that the first white balance data complies with a predetermined target value and a second white balance data is generated; a sending module, configured to send the second white balance data to signal source channels except the target signal source; and a second performing module, configured to perform a second adjustment operation, wherein the second adjustment operation is a second adjustment performed on a third white balance data of the signal source channels according to the second white balance data.

Further, the first performing module may comprise: a first comparing module, configured to compare the predetermined target value with the first white balance data to acquire a comparison result; and a first adjusting module, configured to, when the comparison result indicates that the first white balance data does not comply with the predetermined target value, adjust source data in the first white balance data such that the target data in the first white balance data falls within a range of the predetermined target value.

Further, the first adjusting module may comprise: a second comparing module, configured to compare color coordinates in the first white balance data with the predetermined target value; a first modifying module, configured to, when the color coordinates are smaller than the predetermined target value, modify a red gain or a green gain in the source data; a second modifying module, configured to, re-read the color coordinates, and determine whether the color coordinates fall within the range of the predetermined target value, and if no, modify a blue gain in the source data to ensure that the color coordinates are adjusted as within the range of the predetermined target value.

Further, the second performing module may comprise: an automatic checking module, configured to automatically check whether the second white balance data is duplicated to the signal source channels, and if there is a channel to which the second white balance data has not yet been duplicated, duplicate the second white balance data to the channel.

According to a third aspect of the present invention, a system for adjusting white balance data is provided, and the following technical solution is employed:

A system for adjusting white balance data may comprise: a signal generating device, coupled to a television and configured to control, according to a predetermined pure whiteness, the television to present an image of a target signal source; a color analyzing device, coupled to the television and configured to read out white balance data of the target signal source according to the image; and an apparatus for adjusting white balance data, separately coupled to the signal generating device, the color analyzing device, and the television; and configured to adjust the white balance data according to a predetermined target value, send the adjusted white balance data to signal source channels except a current channel, and perform white balance data adjustment on the signal source channels according to the white balance data.

Further, the apparatus for adjusting white balance data may be further configured to: send an instruction for presenting the image of the target signal source to the signal generating device, wherein the instruction comprises the predetermined target value.

Further, the system for adjusting white balance data may further comprise: an adapter board, a first terminal of the adapter board being coupled, via a COM cable, to a COM interface of the apparatus for adjusting white balance data, and a second terminal of the adapter board being coupled, via a USB cable, to a USB interface of the television.

According to this disclosure, white balance data of a single channel may be adjusted, and hence a data duplication operation may be performed such that white balance data of all the signal sources is maintained consistent. Compared with a traditional multi-path debugging system, great improvements are made, and the production efficiency is greatly improved. In addition, in the system for adjusting white balance data according to this disclosure, manufactured VGA signal cables are used, and the signal cables may be not only used for implementing video signal transmission between a television and a signal generator that are coupled with each other, and but also used for implementing serial port communication data transmission between a PC, the television, and the signal generator. In this way, the total system cost is reduced in terms of hardware couplings, and the entire system is a closed loop system, thereby achieving high data transmission accuracy.

BRIEF DESCRIPTION OF THE DRAWINGS

The accompanying drawings herein, which are incorporated herein and constitute a part of the specification, illustrate several exemplary embodiments of the present invention and together with the description, serve to illustrate the present invention, construing no limitation to the present invention. In the drawings.

DETAILED DESCRIPTION OF THE PREFERRED EMBODIMENTS

Embodiments of the present invention are described in detail with reference to attached drawings. However, the present invention may be implemented in a plurality of manners defined and covered by the appended claims.

Figure 1:
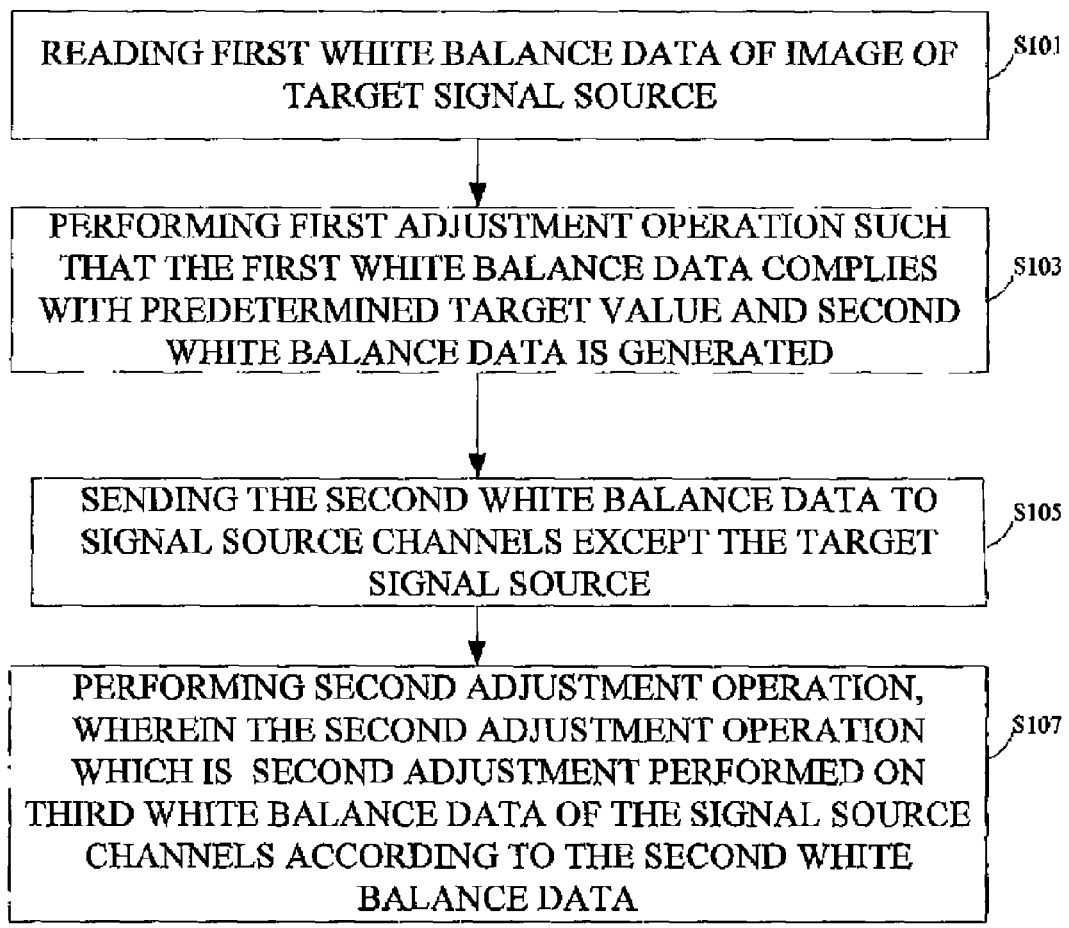
FIG. 1 is a general flowchart of a method for adjusting white balance data according to an embodiment of the present invention.

FIG. 1 is a general flowchart of a method for adjusting white balance data according to an embodiment of the present invention.

Referring to FIG. 1, the method for adjusting white balance data comprises the following steps:

S101: reading a first white balance data of an image of a target signal source;

S103: performing a first adjustment operation such that the first white balance data complies with a predetermined target value and a second white balance data is generated;

S105: sending the second white balance data to signal source channels except the target signal source; and S107: performing a second adjustment operation, wherein the second adjustment operation is a second adjustment performed on a third white balance data of the signal source channels according to the second white balance data.

In step S101, the target signal source is a to-be-adjusted signal source to which the television is automatically switched; and the signal generator gives an image having a predetermined pure whiteness, and reads out color coordinates (x, y), a color temperature T, a luminance $L_V$, and a color difference $\Delta uv$ by using a color analyzer. In step S103, the predetermined target value comprises values of the given color temperature and color coordinates (x, y). In the initial stage of system development, initial white balance data of an experimental sample television is acquired by adjustment according to difference television models, and initial running parameter values needed for system running would be imported into a configuration file, for example. The read white balance data is compared with the predetermined target value. If the white balance data falls within a range of the predetermined target value, step S105 is performed; and if the white balance data does not fall within the range of the predetermined target value, the white balance data is adjusted. In steps S105 and S107, duplication operations are performed. The adjusted white balance data is sent to all the signal source channels except a current channel, and white balance data is adjusted with respect to all the signal source channels according to the adjusted white balance data.

According to the technical solutions in this embodiment, white balance data is adjusted with respect to a single channel, and the adjusted white balance data is duplicated, by means of the duplication operations, to all the signal source channels except the current channel, so as to adjust white balance data of all the signal sources. In this way, the adjustment efficiency is greatly improved, and time for adjusting white balance data is reduced.

Figure 2:
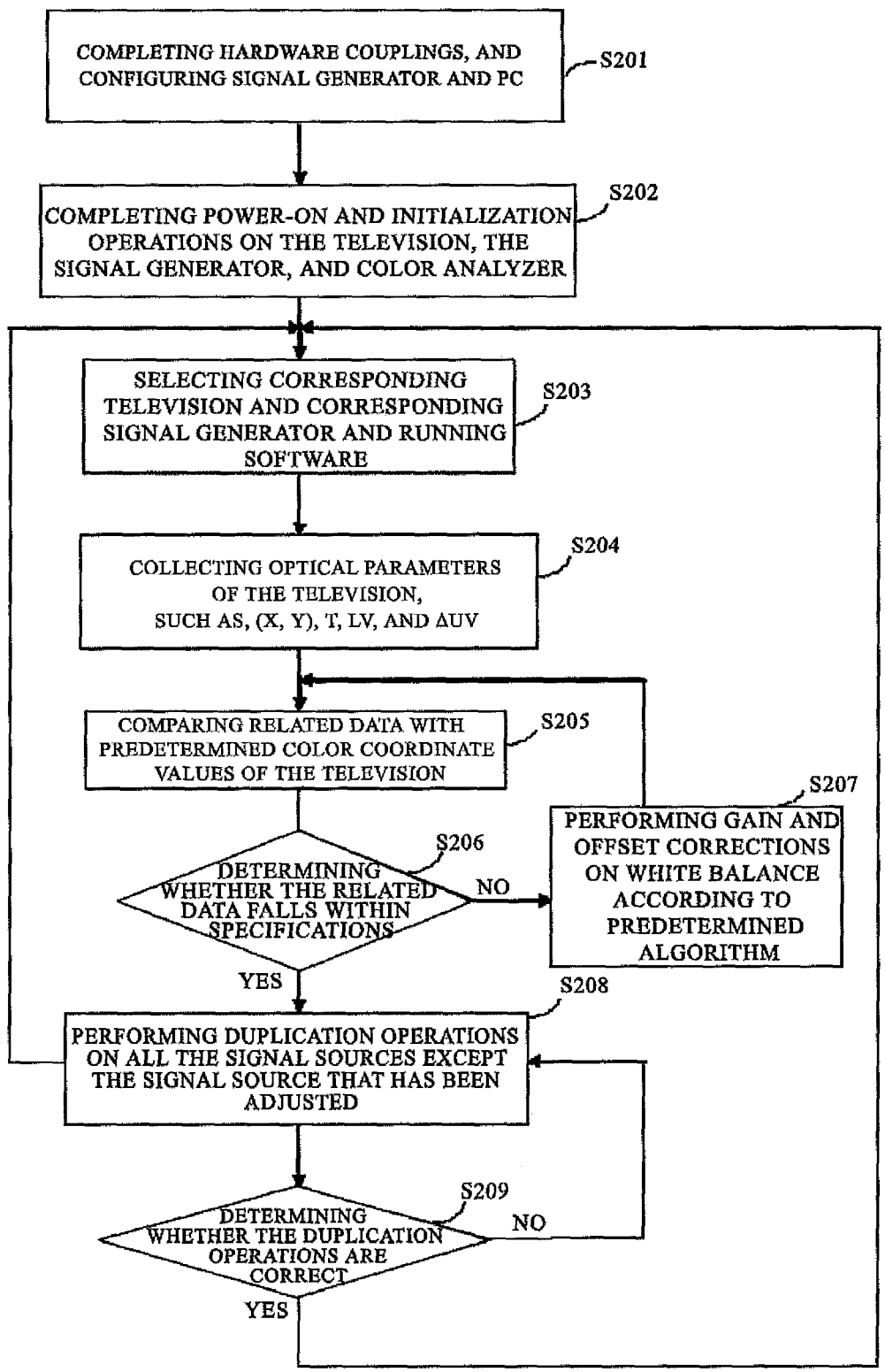
FIG. 2 is a detailed flowchart of a method for adjusting white balance data according to an embodiment of the present invention.

FIG. 2 is a detailed flowchart of a method for adjusting white balance data according to an embodiment of the present invention.

Referring to FIG. 2, in connection with hardware operations, this embodiment discloses detailed procedures of the method for adjusting white balance data.

Step S201: Completing hardware couplings, and configuring a signal generator and a processor.

Step S202: Completing power-on and initialization operations for a television, the signal generator, and a color analyzer.

The above two steps are directed to configuring the coordinated hardware devices and parameters of the hardware devices, and providing preparations for the method for adjusting white balance data. In addition, the processor, for example, a personal computer (PC) in step S201 serves as an implementation carrier of the method for adjusting white balance data.

Step S203: Selecting a corresponding television and a corresponding signal generator to perform the method for adjusting white balance data.

Specifically, a configuration file is copied under a corresponding file directory at a PC end, wherein the configuration file is provided at the initial stage of system development; initial white balance data of an experimental sample television is acquired by adjust ent according to difference television models, thereby ensuring that the adjustment speed of the system is improved during large quantity production; initial running parameter values needed for system running would be imported into the configuration file, mainly comprising: parameters of a COM interface, the baud rates of the signal generator and the television, the error range of white balance adjustment, the values of the color temperature and color coordinates (x, y) of white balance, i.e., given values of the color temperature and color coordinates (x, y); and a corresponding model and a corresponding signal generator are selected in adjustment software.

Step S204: Collecting (x, y), T, $L_V$, and $\Delta$uv of the television.

Here, (x, y) denotes color coordinates, T denotes a color temperature, $L_V$ denotes a luminance, and $\Delta$uv denotes a color difference.

Specifically, the target signal source is a to-be-adjusted signal source to which the television is automatically switched; and the signal generator gives an image having a predetermined pure whiteness, and reads out the color coordinates (x, y), the color temperature T, the luminance $L_V$, and the color difference $\Delta$uv by using a color analyzer.

Step S205: Comparing related data with predetermined color coordinate values of the television.

Step S206: Determining whether the related data falls within specifications.

That is, it is determined whether the read white balance data falls within a range of the predetermined target value; if yes, step S208 is performed; and if no, step S207 is performed.

Step S207: Performing gain and offset (dark field offset) correction for white balance according to a predetermined algorithm, and performing the above comparison again.

More specifically, an apparatus for adjusting white balance data at the PC end compares the read related data in step S204 with the predetermined target value. If the target value is not satisfied, the gain value of white balance is corrected according to practical data of the television and the predetermined algorithm. When the white balance requirement is satisfied, the process ends. If specification requirements are satisfied, step S208 is directly performed. For example, it is required that the standard color temperature value of the video graphics array (VGA) channel be 9300, the color coordinates be ($x_0$=0.283, $y_0$=0.297), the minimum factory luminance value be 200 nits, and the given initial white balance values R GAIN, G GAIN, B Gains be all 128; in this case, the system firstly sends 128, 128, and 128 to a to-be-adjusted target channel and target color temperature, then the color analyzer automatically reads out the color coordinates (x, y), for example, the color coordinates (x=0.272, y=0.277), of the television under the white balance parameters, and finally, the system compares related data with the color temperature 9300 and the color coordinates (x=0.283, y=0.297) given by the system. A system-defined algorithm is to firstly compare the value of the color coordinate x. In this case, x=0.272<$x_0$=0.283, and the system automatically completes an operation for adding 1 to R GAIN, i.e., a red gain in the white balance data, and sends in real time the adjusted R GAIN data to the television and reads out once more the value of the color coordinate x. If the R GAIN, i.e., the red gain, increases to its maximum but still fails to be adjusted to the range of the color coordinate $x_0$=0.283, then the system automatically completes an operation for adding 1 to B GAIN, i.e., a blue gain in the white balance data, and sends in real time the adjusted B GAIN data to the television and reads out once more the value of the color coordinate x until the color coordinate $x_0$=0.283 is satisfied. In this case, y=0.277<$y_0$=0.297, and the system automatically completes an operation for adding 1 to G GAIN, i.e., a green gain in the white balance data, and sends in real time the adjusted G GAIN data to the television and reads out once more the value of the color coordinate y. If the G GAIN, i.e., the green gain, increases to its maximum but still fails to be adjusted to the range of the color coordinate $y_0$=0.297, then the system automatically completes an operation for adding 1 to B GAIN, i.e., a blue gain in the white balance data, and sends in real time the adjusted B GAIN data to the television and reads out once more the value of the color coordinate y until the color coordinate $y_0$=0.297 is satisfied. Upon completion of the adjustment, the PC end software automatically sends the adjusted white balance data to all television channels except the VGA channel. In this case, the standard color temperature 9300 of the VGA channel of the television is adjusted successfully.

Step S208: Performing duplication operations on all the signal sources except the signal source that has been adjusted.

The white balance adjustment software automatically stores the gain and offset values satisfying a color temperature requirement, and automatically completes the duplication operations on all the signal sources except the adjusted signal source of the television.

Step S209: Determining whether the duplication operations are correct; if yes, the process ends or step S203 may be performed to conduct adjustment for another television; and if no, step S208 is performed.

Upon completion of the duplication operations, the program automatically performs checking. If the duplication operations fail, step S205 is performed again and then checking is performed to ensure that white balance adjustment is completed for one television upon successful duplication.

Preferably, the above-described duplication processes may be all automatic duplication operations, which are favorable for simplifying operations and procedures.

To adjust white balance of a television, a traditional system needs to adjust four paths of channels: VGA, high-definition multimedia interface (HDMI), a color difference component interface ($YP_BP_R$), and audio and video interface (AV). According to the technical solution in this embodiment, the system only needs to adjust the VGA channel, and completes white balance data adjustment for other channels by means of duplication operations, thereby implementing white balance data adjustment for all the channels of a television. Therefore, the time for adjusting white balance data of a television is only a quarter of that for adjusting white balance data of a television using a traditional system.

Figure 3:
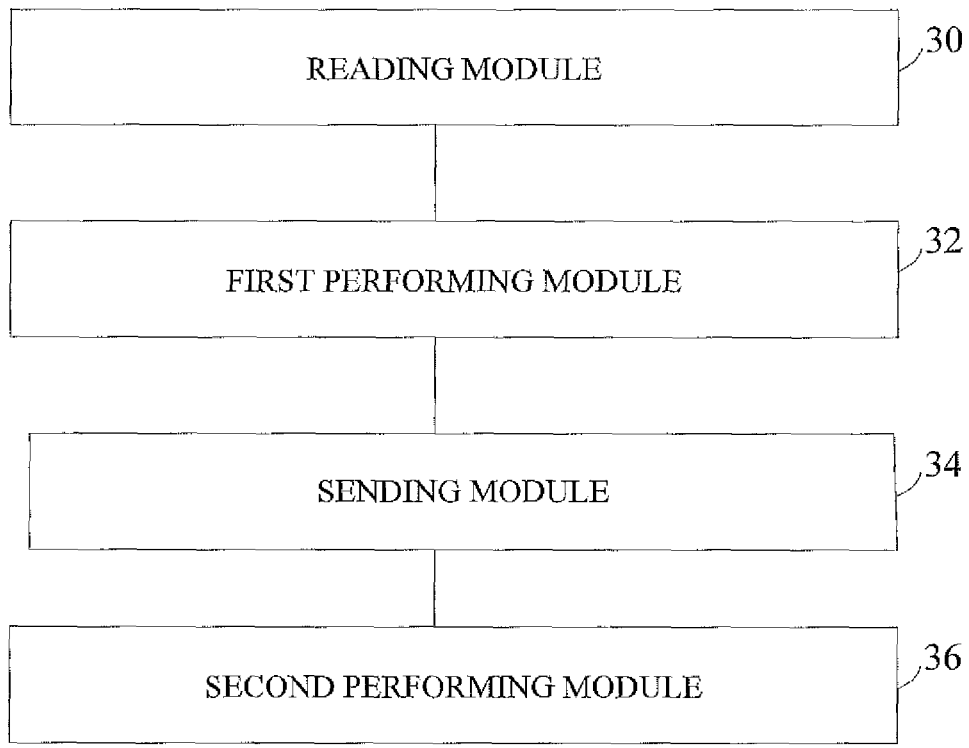
FIG. 3 is a schematic structural view of an apparatus for adjusting white balance data according to an embodiment of the present invention.

FIG. 3 is a schematic structural view of an apparatus for adjusting white balance data according to an embodiment of the present invention.

Referring to FIG. 3, the apparatus for adjusting white balance data comprises: a reading module 30, configured to read a first white balance data of an image of a target signal source; a first performing module 32, configured to perform a first adjustment operation such that the first white balance data complies with a predetermined target value and a second white balance data is generated; a sending module 34, configured to send the second white balance data to signal source channels except the target signal source; and a second performing module 36, configured to perform a second adjustment operation, wherein the second adjustment operation is a second adjustment performed on a third white balance data of the signal source channels according to the second white balance data.

Preferably, the first performing module 32 comprises: a first comparing module (not illustrated in the drawings), configured to compare the predetermined target value with the first white balance data to acquire a comparison result; and a first adjusting module (not illustrated in the drawings), configured to, when the comparison result indicates that the first white balance data does not comply with the predetermined target value, adjust source data in the first white balance data such that the target data in the first white balance data falls within a range of the predetermined target value.

Preferably, the first adjusting module (not illustrated in the drawings) comprises: a second comparing module (not illustrated in the drawings), configured to compare color coordinates in the first white balance data with the predetermined target value; a first modifying module (not illustrated in the drawings), configured to, when the color coordinates are smaller than the predetermined target value, modify a red gain or a green gain in the source data; a second modifying module (not illustrated in the drawings), configured to, re-read the color coordinates, and determine whether the color coordinates fall within the range of the predetermined target value, and if no, modify a blue gain in the source data to ensure that the color coordinates are adjusted as within the range of the predetermined target value.

Preferably, the second performing module 36 comprises: an automatic checking module (not illustrated in the drawings), configured to automatically check whether the second white balance data is duplicated to the signal source channels, and if there is a channel to which the second white balance data has not yet been duplicated, duplicate the second white balance data to the channel.

Figure 4:
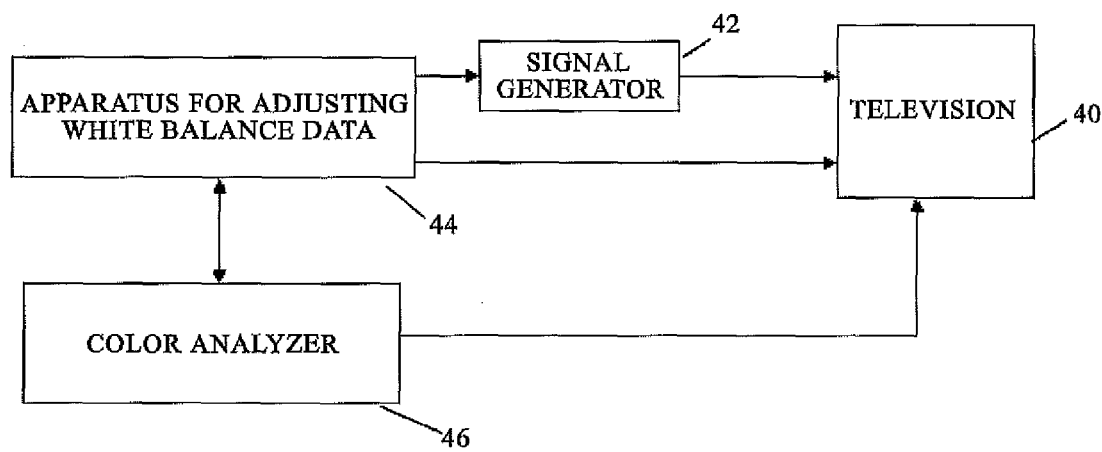
FIG. 4 is a schematic structural view of a system for adjusting white balance data according to an embodiment of the present invention.

FIG. 4 is a schematic structural view of a system for adjusting white balance data according to an embodiment of the present invention.

Referring to FIG. 4, the system for adjusting white balance data mainly comprises: a signal generator 42, a color analyzer 46, and an apparatus 44 for adjusting white balance data; wherein a PC where the apparatus 44 for adjusting white balance data is deployed is coupled to a television 40, the color analyzer 46, and the signal generator 42 via a COM-to-USB cable, a USB cable, and a COM cable respectively. The television 40, the color analyzer 46, and the signal generator 42 are uniformly controlled by white balance adjusting software.

The apparatus 44 for adjusting white balance data may be the above-described apparatus for adjusting white balance data (as illustrated in FIG. 3), and is configured to adjust the white balance data according to a predetermined target value, send the adjusted white balance data to signal source channels except a current channel (i.e., a target signal source or a target signal source channel), and perform white balance adjustment on the signal source channel according to the white balance data. Preferably, the adjusted white balance data is sent to all the signal source channels except the current channel.

Compared with a traditional white balance multi-path debugging system, hardware couplings in the system according to this disclosure are greatly improved. In the traditional white valance multi-path debugging system, with respect to hardware couplings, the VGA, HDMI, $YP_BP_R$, and AV channels are all coupled to corresponding interfaces of the signal generator. To be specific, during production on the production line, during white balance adjustment, operators need to couple all the four channels to a television before adjusting white balance for the television. In this way, great inconvenience is caused to the operators, much time is spent in plugging and unplugging the signal cables coupled to the four channels, and the production efficiency in white balance adjustment on the television production line is greatly lowered.

Preferably, the apparatus for adjusting white balance data is further configured to: send an instruction for presenting the image of the target signal source to the signal generating device, the instruction comprising the predetermined target value.

Preferably, the system for adjusting white balance data further comprises: an adapter board (not illustrated in the drawings), a first terminal of the adapter board being coupled, via a COM cable, to a COM interface of the apparatus for adjusting white balance data, and a second terminal of the adapter board being coupled, via a USB cable, to a USB interface of the television.

The adapter board may be not only used for implementing video signal transmission between a television and a signal generator that are coupled with each other, and but also used for implementing serial port communication data transmission between a PC, the television, and the signal generator. In this way, the total system cost is reduced in terms of hardware couplings.

This disclosure removes limitations on hardware couplings in the traditional white balance multi-path adjustment. Only one manufactured VGA signal cable is needed to couple a television, a signal generator, and a PC in this disclosure. Automatic value assignment operations are completed for other channels of the television by means of data transfer between PC end software and television software, thereby completing white balance adjustment for the television. Compared with the traditional white balance adjustment system, this disclosure achieves the following two optimizations in terms of time: 1. time for plugging and unplugging signal cables by operators on the production line; 2. time for adjusting white balance data by the system. With respect to the time for plugging and unplugging signal cables by operators, according to this disclosure, the time for plugging and unplugging signal cables is only a quarter of that for plugging and unplugging signal cables in the traditional system. With respect to the time for adjusting white balance data by the system, to adjust white balance of a television, a traditional system needs to adjust four paths of channels: VGA, HDMI, $YP_BP_R$, and AV, whereas the system in this disclosure needs to adjust only the VGA channel. Therefore, according to this disclosure, the time for adjusting white balance for a television is only a quarter of that for adjusting white balance in the traditional system. With reference to the above two optimizations, the system according to this disclosure is unique in that an adapter is provided, which may not only implement video signal transmission between a television and a signal generator that are coupled with each other, and but also implement serial port communication data transmission between a PC, the television, and the signal generator. In this way, the total system cost is reduced in terms of hardware couplings, and great improvements are made in terms of adjustment time compared with a traditional multi-path debugging system, thereby greatly improving the production efficiency on the production line. In addition, the entire system is a closed loop system, thereby achieving high data transmission accuracy.

What is claimed is:

1. A method for adjusting white balance data, comprising:
reading only a first white balance data of an image of a certain target signal source, without reading white balance data of other signal sources other than the certain target signal source;
performing a first adjustment operation such that the first white balance data complies with a predetermined target value and a second white balance data is generated;
sending the second white balance data to signal source channels of the other signal sources except the certain target signal source; and
performing a second adjustment operation, wherein the second adjustment operation is a second adjustment performed on a third white balance data of the signal source channels of the other signal sources according to the second white balance data,
wherein the performing of a first adjustment operation comprises:
comparing the predetermined target value with the first white balance data to acquire a comparison result; and
when the comparison result indicates that the first white balance data does not comply with the predetermined target value, adjusting source data in the first white balance data such that the target data in the first white balance data falls within a range of the predetermined target value.

2. The method according to claim 1, wherein the adjusting source data in the first white balance data comprises:
comparing color coordinates in the first white balance data with the predetermined target value;
when the color coordinates are smaller than the predetermined target value, modifying a red gain or a green gain in the source data; and
re-reading the color coordinates, and determining whether the color coordinates fall within the range of the predetermined target value, if no, modifying a blue gain in the source data to ensure that the color coordinates are adjusted as within the range of the predetermined target value.

3. The method according to claim 1, wherein the performing a second adjustment on a third white balance data of the signal source channels according to the second white balance data comprises:
checking automatically whether the second white balance data is duplicated to the signal source channels, and if there is a channel to which the second white balance data has not yet been duplicated, duplicating the second white balance data to the channel.

4. The method according to claim 1, wherein the image of the target signal source is an image having a predetermined pure whiteness given by a signal generator; and color coordinates (x, y), a color temperature T, a luminance $L_V$, and a color difference Δuv are read out by using a color analyzer.

5. The method according to claim 1, wherein the signal source channels except the target signal source are configured to adjust white balance data on the basis of a single channel.

6. The method according to claim 5, wherein the adjusted white balance data is duplicated after the white balance data is input into the single channel, so as to duplicate the adjusted white balance data into all the signal source channels except the current channel by means of the duplication operations, such that white balance data of all the signal sources are adjusted.

7. The method according to claim 5, wherein the single channel is a video graphics array (VGA) channel.

8. An apparatus for adjusting white balance data, comprising:
a storage device configured to store computer programs;
a processor configured to be coupled with the storage device,
wherein the processor, when calling and executing the computer programs stored in the storage device, is configured to achieve the following units:
a reading module configured to read only a first white balance data of an image of a certain target signal source, without reading white balance data of other signal sources other than the certain target signal source;
a first performing module configured to perform a first adjustment operation such that the first white balance data complies with a predetermined target value and a second white balance data is generated;
a sending module configured to send the second white balance data to signal source channels of the other signal sources except the certain target signal source; and
a second performing module configured to perform a second adjustment operation, wherein the second adjustment operation is a second adjustment performed on a third white balance data of the signal source channels of the other signal sources according to the second white balance data,
wherein the first performing module comprises:
a first comparing module configured to compare the predetermined target value with the first white balance data to acquire a comparison result; and
a first adjusting module configured to, when the comparison result indicates that the first white balance data does not comply with the predetermined target value, adjust source data in the first white balance data such that the target data in the first white balance data falls within a range of the predetermined target value.

9. The apparatus according to claim 8, wherein the first adjusting module comprises:
a second comparing module configured to compare color coordinates in the first white balance data with the predetermined target value;
a first modifying module configured to, when the color coordinates are smaller than the predetermined target value, modify a red gain or a green gain in the source data; and
a second modifying module configured to, re-read the color coordinates, and determine whether the color coordinates fall within the range of the predetermined target value, and if no, modify a blue gain in the source data to ensure that the color coordinates are adjusted as within the range of the predetermined target value.

10. The apparatus according to claim 8, wherein the second performing module comprises:
an automatic checking module configured to automatically check whether the second white balance data is duplicated to the signal source channels, and if there is a channel to which the second white balance data has not yet been duplicated, duplicate the second white balance data to the channel.

11. The apparatus according to claim 8, wherein the image of the target signal source is an image having a predetermined pure whiteness given by a signal generator; and color coordinates (x, y), a color temperature T, a luminance $L_V$, and a color difference Δuv are read out by using a color analyzer.

12. The apparatus according to claim 8, wherein the signal source channels except the target signal source are configured to adjust white balance data on the basis of a single channel.

13. The apparatus according to claim 12, wherein the adjusted white balance data is duplicated after the white balance data is input into the single channel, so as to duplicate the adjusted white balance data into all the signal source channels except the current channel by means of the duplication operations, such that white balance data of all the signal sources are adjusted.

14. The apparatus according to claim 12, wherein the single channel is a video graphics array (VGA) channel.

15. A system for adjusting white balance data, comprising:
a signal generating device coupled to a television and configured to control, according to a predetermined pure whiteness, the television to present an image of a target signal source;
a color analyzing device coupled to the television and configured to read out white balance data of the target signal source according to the image; and
an apparatus for adjusting white balance data separately coupled to the signal read only a first white balance data of an image of a certain target signal source, without reading white balance data of other signal sources other than the certain target signal source; perform a first adjustment operation such that the first white balance data complies with a predetermined target value and a second white balance data is generated; send the second white balance data to signal source channels of the other signal sources except the certain target signal source; and perform a second adjustment operation, wherein the second adjustment operation is a second adjustment performed on a third white balance data of the signal source channels of the other signal sources according to the second white balance data, wherein the apparatus for adjusting white balance data comprises:
a first comparing module, configured to compare the predetermined target value with the first white balance data to acquire a comparison result; and
a first adjusting module, configured to, when the comparison result indicates that the first white balance data does not comply with the predetermined target value, adjust source data in the first white balance data such that the target data in the first white balance data falls within a range of the predetermined target value.

16. The system according to claim 15, wherein the apparatus for adjusting white balance data is further configured to:
send an instruction for presenting the image of the target signal source to the signal generating device, wherein the instruction comprises the predetermined target value.

17. The system according to claim 15, further comprising:
an adapter board, a first terminal of the adapter board being coupled, via a COM cable, to a COM interface of the apparatus for adjusting white balance data, and a second terminal of the adapter board being coupled, via a USB cable, to a USB interface of the television.

18. The system according to claim 17, wherein the adapter board not only implements video signal transmission between the television and the signal generating device, but also implements serial port communication data transmission between a PC, the television, and the signal generating device.

* * * * *